United States Patent [19]

Katou et al.

[11] Patent Number: 4,506,644
[45] Date of Patent: Mar. 26, 1985

[54] EXHAUST GAS-PURIFYING DEVICE OF AN INTERNAL COMBUSTION ENGINE

[75] Inventors: Takashi Katou; Takaaki Itou, both of Mishima, Japan

[73] Assignee: Toyota Jidosha Kabushiki Kaisha, Toyota, Japan

[21] Appl. No.: 455,798

[22] Filed: Jan. 5, 1983

[30] Foreign Application Priority Data

Jul. 7, 1982 [JP] Japan .................... 57-117016

[51] Int. Cl.³ .................................... F02M 9/06
[52] U.S. Cl. ......................... 123/439; 261/44 C; 261/121 B; 261/DIG. 56
[58] Field of Search ........... 123/437, 438, 439, 440, 123/585, 589; 261/44 C, 121 B, DIG. 56

[56] References Cited

U.S. PATENT DOCUMENTS

| | | | |
|---|---|---|---|
| 3,963,009 | 6/1976 | Mennesson | 261/44 C |
| 4,024,706 | 5/1977 | Adawi et al. | 60/274 |
| 4,060,064 | 11/1977 | Minami | 261/44 C |
| 4,185,054 | 1/1980 | Nakamura et al. | 261/44 C |
| 4,199,938 | 4/1980 | Nakase et al. | 60/274 |
| 4,264,537 | 4/1981 | Watanabe et al. | 123/439 |
| 4,302,404 | 11/1981 | Nakamura et al. | 261/44 C |
| 4,305,893 | 12/1981 | Morino | 261/44 C |
| 4,341,190 | 7/1982 | Ishikawa et al. | 123/439 |
| 4,369,749 | 1/1983 | Sugi | 123/439 |
| 4,383,409 | 5/1983 | Otsuka et al. | 60/276 |
| 4,434,111 | 2/1984 | Teramura et al. | 261/44 C |

OTHER PUBLICATIONS

Gandhi et al., "Laboratory Evaluation of Three-Way Catalysts", Society of Automotive Engineers, Inc. (Paper No. 760201, 1976 SAE Automotive Engineering Congress and Exposition, Detroit, MI) Feb. 1976.

Primary Examiner—Tony M. Argenbright
Assistant Examiner—W. R. Wolfe
Attorney, Agent, or Firm—Finnegan, Henderson, Farabow, Garrett & Dunner

[57] ABSTRACT

An engine comprising a variable venturi-type carburetor which has a raised wall formed on the inner wall of the intake passage thereof. The suction piston of the carburetor has a tip face having a V-shaped cross-sectional upstream end portion which cooperates with the raised wall for defining an approximately isosceles triangle-shaped airflow-restricting opening therebetween when the amount of air flowing within the intake passage is small. An electromagnetic valve is arranged in an air-bleed passage of the carburetor and is periodically opened at a fixed frequency of 1 to 2 Hz so that the air-fuel ratio fluctuates at a fixed frequency within the range of a ±0.2 A/F unit through a ±1.0 A/F unit relative to an approximately stoichiometric air-fuel ratio.

5 Claims, 8 Drawing Figures

EXHAUST GAS-PURIFYING DEVICE OF AN INTERNAL COMBUSTION ENGINE

BACKGROUND OF THE INVENTION

The present invention relates to an exhaust gas-purifying device for use in an internal combustion engine.

As a catalyzer capable of simultaneously reducing the amount of three harmful components (HC, CO, and $NO_x$) in exhaust gas, a three-way catalyzer is known. As illustrated in FIG. 1 (a), when the air-fuel ratio A/F is equal to an approximately stoichiometric air-fuel ratio, the efficiency R of HC, CO, and $NO_x$ conversion in the three-way catalyzer reaches a maximum, and the range of the air-fuel ratio, in which a conversion efficiency of more than 80 percent can be obtained, is a narrow range of about 0.06 A/F unit. The range of the air-fuel ratio, in which a conversion efficiency of more than 80 percent can be obtained, is normally called a window W. Consequently, in order to simultaneously reduce the amount of the three harmful components in the exhaust gas by using a three-way catalyzer, it is necessary to continuously maintain the air-fuel ratio within the window W, which is a narrow range. To this end, in a conventional exhaust gas-purifying device, an oxygen concentration detector, capable of detecting whether the air-fuel ratio is larger or smaller than the stoichiometric air-fuel ratio, is arranged in the exhaust passage of the engine, and the air-fuel ratio is controlled so that it becomes equal to the air-fuel ratio within the window W on the basis of the output signal of the oxygen concentration detector. However, in a conventional exhaust gas-purifying device using such an oxygen concentration detector, since an expensive oxygen concentration detector and an expensive electronic control unit for controlling the air-fuel ratio are necessary, a problem occurs in that the manufacturing cast of the exhaust gas-purifying device is increased.

However, recently, as disclosed in SAE paper No. 760201 and U.S. Pat. No. 4,024,706, the function of the three-way catalyzer has gradually been clarified, and it has been proven that the three-way catalyzer has an oxygen storage function. That is, when the air-fuel ratio is on the lean side of the stoichiometric air-fuel ratio, the three-way catalyzer accepts oxygen from $NO_x$ and reduces $NO_x$, and the three-way catalyzer stores therein the accepted oxygen. On the other hand, when the air-fuel ratio is on the rich side of the stoichiometric air-fuel ratio, the three-way catalyzer releases the stored oxygen therefrom and oxidizes CO and HC. Therefore, in a case where the air-fuel ratio fluctuates relative to a given reference air-fuel ratio so that the air-fuel ratio is alternately on the lean side and the rich side of the stoichiometric air-fuel ratio, even if the reference air-fuel ratio is offset from the stoichiometric air-fuel ratio, the reducing reaction of $NO_x$ and the oxydizing reaction of CO and HC are promoted due to the above-mentioned oxygen storage function, thus making it possible to obtain a high conversion efficiency. FIG. 1(b) illustrates a window $W_0$ of the reference air-fuel ratio A/F in a case where the air-fuel ratio fluctuates at a frequency of 1 Hz by a $\pm 0.1$ A/F unit relative to the reference air-fuel ratio. From FIGS. 1(a) and 1(b), it will be understood that if the air-fuel ratio fluctuates at a fixed frequency, the width of the window is increased. This means that if the air-fuel ratio fluctuates at a fixed frequency, a high conversion efficiency can be obtained even if the reference air-fuel ratio is somewhat offset from the stoichiometric air-fuel ratio. On the other hand, if the frequency of fluctuation of the air-fuel ratio becomes low, that is, if the time period of fluctuation of the air-fuel ratio becomes long, since the oxygen storage capacity of the three-way catalyzer becomes saturated, the oxygen storage ability of the three-way catalyzer is reduced. As a result, the conversion efficiency of the three-way catalyzer is reduced. This is clearly illustrated in FIG. 1(c). In FIG. 1(c), the ordinate R indicates conversion efficiency, and the abscissa F indicates the frequency of fluctuation of the air-fuel ratio. In addition, if the range of fluctuation of the air-fuel ratio becomes small, since it is impossible to fluctuate the air-fuel ratio so that it is alternately on the lean side and the rich side of the stoichiometric air-fuel ratio, the width of the window becomes narrow. Consequently, it will be understood that an optimum frequency and an optimum range of fluctuation of the air-fuel ratio are present for increasing the width of the window W.

As mentioned above, if the range of fluctuation of the air-fuel ratio relative to the reference air-fuel ratio and the frequency of fluctuation of the air-fuel ratio are suitably determined, the width of the window W is increased. Therefore, even if the reference air-fuel ratio fluctuates relative to the stoichiometric air-fuel ratio, a high conversion efficiency can be obtained. This means that if a fuel supply system, in which the range of fluctuation of the reference air-fuel ratio is narrow, is used, a high conversion efficiency can be obtained without using feedback control based on the output signal of the oxygen concentration detector. Of course, if a fuel injection system is used as such a fuel supply system, it is possible to reduce the range of fluctuation of the reference air-fuel ratio. However, since a fuel injection system is very expensive, a problem occurs in that the manufacturing cost of the engine is increased. Consequently, in order to reduce the manufacturing cost of the engine, it is necessary to use a carburetor. However, in a conventional fixed venturi-type carburetor, the range of fluctuation of the reference air-fuel ratio is wide, and in a conventional variable venturi-type carburetor, the reference air-fuel ratio fluctuates considerably at the time of acceleration and in response to a change in the temperature of the engine. Consequently, it is difficult to obtain a high conversion efficiency by using either a conventional fixed venturi-type carburetor or a conventional variable venturi-type carburetor.

SUMMARY OF THE INVENTION

An object of the present invention is to provide an exhaust gas-purifying device capable of obtaining a high conversion efficiency by using an inexpensive carburetor.

According to the present invention, there is provided an exhaust gas-purifying device of an internal combustion engine having an exhaust passage, a three-way catalytic converter arranged in the exhaust passage, and a carburetor having therein an intake passage and a fuel passage for feeding fuel into the intake passage, said device comprising: an air-bleed passage connected to the fuel passage for feeding air into the fuel passage; valve means arranged in the air-bleed passage for controlling the flow area of the air-bleed passage; and control means for controlling the opening operation of the valve means to periodically open the valve means at a fixed frequency of 1 through 2 Hz, the air-bleed passage having a flow area which causes the air-fuel ratio of the fuel mixture formed in the intake passage to fluctuate within the range of a ±0.2 A/F unit through a ±1.0 A/F unit relative to an approximately stoichiometric air-fuel ratio when the valve means periodically opens.

The present invention may be more fully understood from the description of a preferred embodiment of the invention set forth below, together with the accompanying drawings.

DESCRIPTION OF A PREFERRED EMBODIMENT

Figure 2:
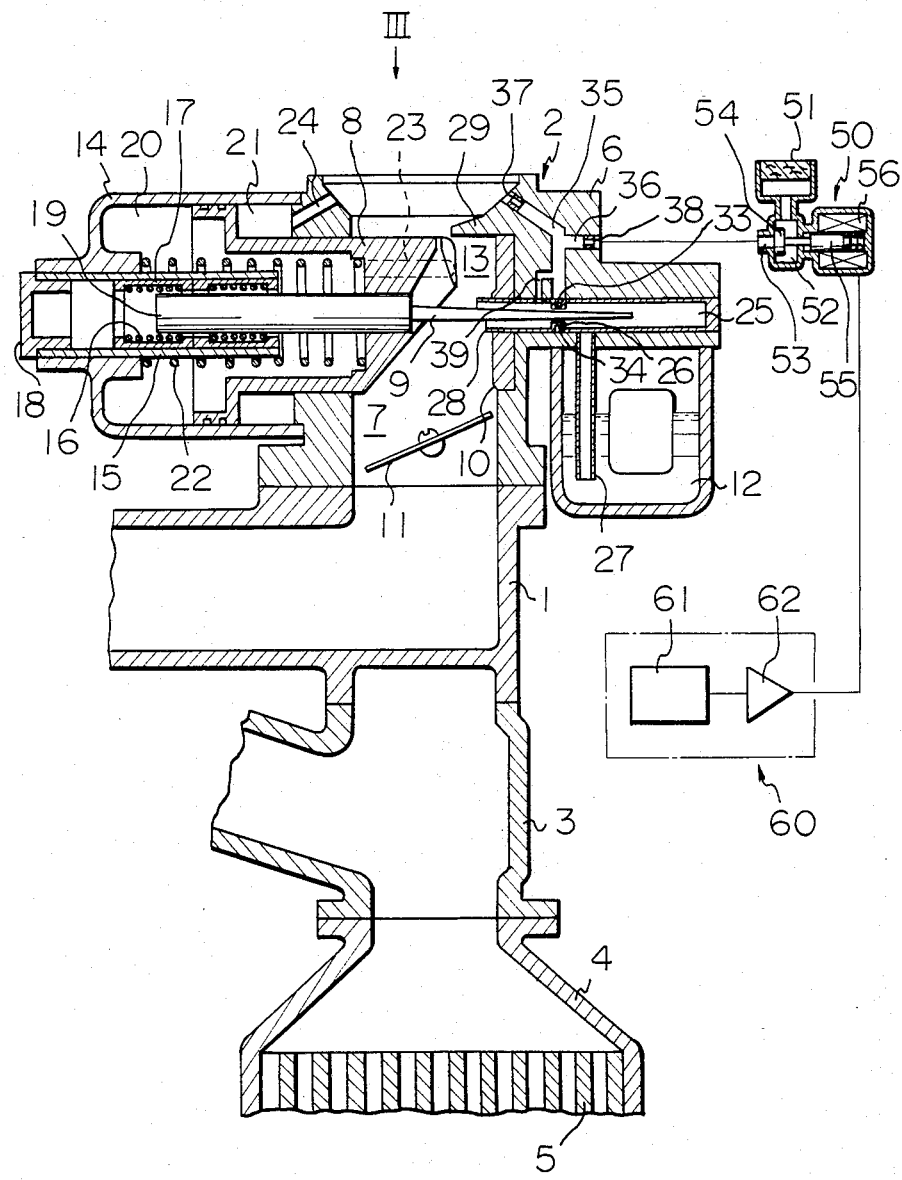
FIG. 2 is a cross-sectional side view of the intake system of an engine.

Referring to FIG. 2, reference numeral 1 designates an intake manifold, 2 a variable venturi-type carburetor mounted on the intake manifold 1, 3 an exhaust manifold, and 4 a catalytic converter. A three-way monolith catalyzer 5 is arranged in the catalytic converter 4. The variable venturi-type carburetor 2 comprises a carburetor housing 6, an intake passage 7 vertically extending in the housing 6, a suction piston 8 transversely movable in the intake passage 7, a needle 9 fixed on the tip face of the suction piston 8, a spacer 10 facing the tip face of the suction piston 8 and fixed on the inner wall of the intake passage 7, a throttle valve 11 arranged in the intake passage 7 at a position located downstream of the suction piston 8, and a float chamber 12. A venturi portion 13 is formed between the spacer 10 and the tip face of the suction piston 8. A hollow cylindrical casing 14 is fixed onto the carburetor housing 6, and a guide sleeve 15, extending within the casing 14 in the axial direction of the casing 14, is attached to the casing 14. A bearing 17, equipped with a plurality of balls 16, is inserted into the guide sleeve 15, and the outer end of the guide sleeve 15 is closed with a blind cap 18. On the one hand, a guide rod 19 is fixed on the suction piston 8 and is inserted into the bearing 17 so as to be movable in the axial direction thereof. Since the suction piston 8 is supported by the casing 14 via the bearing 17, as mentioned above, the suction piston 8 is able to smoothly move in the axial direction. The interior of the casing 14 is divided into a vacuum chamber 20 and an atmospheric pressure chamber 21 by the suction piston 8, and a compression spring 22 for continuously biasing the suction piston 8 towards the venturi portion 13 is inserted into the vacuum chamber 20. The vacuum chamber 20 is connected to the venturi portion 13 via a suction hole 23 formed in the suction piston 8, and the atmospheric pressure chamber 21 is connected to the intake passage 7 located upstream of the suction piston 8 via an air hole 24 formed in the carburetor housing 6.

On the other hand, a fuel passage 25 is formed in the carburetor housing 6 and extends in the axial direction of the needle 9 so that the needle 9 can enter into the fuel passage 25. A metering jet 26 is arranged in the fuel passage 25. The fuel passage 25, located upstream of the metering jet 26, is connected to the float chamber 12 via a downwardly-extending fuel pipe 27, and fuel in the float chamber 12 is fed into the fuel passage 25 via the fuel pipe 27. In addition, a hollow cylindrical nozzle 28, arranged coaxially to the fuel passage 25, is fixed on the spacer 10. The nozzle 28 projects from the inner wall of the spacer 10 into the venturi portion 13, and, in addition, the upper half of the tip portion of the nozzle 28 projects beyond the lower half of the tip portion of the nozzle 28 towards the suction piston 8. The needle 9 extends through the interior of the nozzle 28 and the metering jet 26, and fuel is fed into the intake passage 7 from the nozzle 28 after it is metered by an annular gap formed between the needle 9 and the metering jet 26.

As illustrated in FIG. 2, a raised wall 29, projecting horizontally into the intake passage 7, is formed at the upper end of the spacer 10, and flow control is effected between the raised wall 29 and the tip end portion of the suction piston 8. When the engine is started, air flows downwards within the intake passage 7. At this time, since the airflow is restricted to between the suction piston 8 and the raised wall 29, a vacuum is created in the venturi portion 13. This vacuum acts on the vacuum chamber 20 via the suction hole 23. The suction piston 8 moves so that the pressure difference between the vacuum in the vacuum chamber 20 and the pressure in the atmospheric pressure chamber 21 becomes approximately equal to a fixed value determined by the spring force of the compression spring 22, that is, the level of the vacuum created in the venturi portion 13 remains approximately constant.

Figure 3:
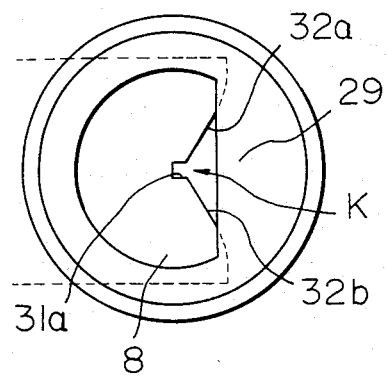
FIG. 3 is a plan view taken in the direction of the arrow III in FIG. 2.
Figure 4:
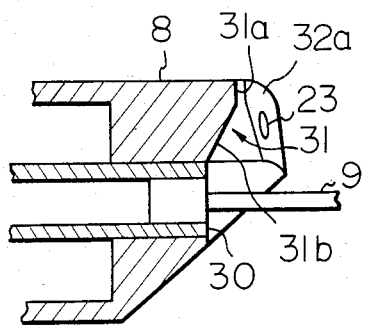
FIG. 4 is a cross-sectional side view of a suction piston.

Referring to FIGS. 3 and 4, the entire tip face portion of the suction piston 8, which is located upstream of the needle 9, projects from a needle-mounting face 30 towards the tip of the needle 9, and a groove 31, extending along the axis of the intake passage 7, is formed on the above-mentioned tip end portion of the suction piston 8. The upstream end portion 31a of the groove 31 has a U-shaped cross section and is located at a position near the tip of the needle 9 relative to the needle-mounting face 30. The remaining portion 31b of the groove 31, which is substantially straight, extends from the upstream end portion 31a to the needle-mounting face 30. In addition, the tip face portion of the suction piston 8, which is located upstream of the needle 9, has a V-shaped cross section which expands from the groove 31 towards the venturi portion 13, and, therefore, the tip face portion of the suction piston 8 has a pair of inclined wall portions 32a and 32b, each being inclined towards the groove 31.

As will be understood from FIG. 3, when the amount of air fed into the cylinder of the engine is small, an airflow-restricting opening K, having an approximately isosceles triangle shape, is defined by the raised wall 29, the inclined wall portions 32a and 32b, and the upstream end portion 31a of the groove 31. By forming the airflow-restricting opening K so that it has an approximately isosceles triangle shape, since the lift of the suction piston 8 is proportional to the flow area of the airflow-restricting opening K, the suction piston 8 can smoothly move in accordance with an increase in or a decrease in the amount of air fed into the cylinder of the engine. In addition, since the suction piston 8 is supported by the bearing 17, the suction piston 8 can move in response to a change in the amount of air fed into the cylinder of the engine. Consequently, when the amount of air fed into the cylinder of the engine is increased, the suction piston 8 can smoothly move in response to the increase in the amount of air fed into the cylinder of the engine. Therefore, even if the amount of air fed into the cylinder of the engine is abruptly changed, as in a case where the engine is accelerated, since the lift of the suction piston 8 is increased in proportion to the increase in the amount of air fed into the cylinder of the engine, the amount of fuel fed from the nozzle 28 is continuously proportional to the amount of air fed into the cylinder of the engine. In addition, as will be understood from FIG. 3, when the amount of air fed into the cylinder of the engine is small, the air flows within the central portion of the intake passage 7. As a result, even if the amount of air fed into the cylinder of the engine is small, the fuel, fed from the nozzle 28, is instantaneously fed into the cylinder of the engine together with the air. Consequently, even if the amount of air fed into the cylinder of the engine is abruptly changed, as in a case where the engine is accelerated, since the amount of fuel fed from the nozzle 28 is proportional to the amount of air fed into the cylinder of the engine and since the fuel fed from the nozzle 28 is instantaneously fed into the cylinder of the engine, as mentioned above, the air-fuel ratio of the fuel mixture fed into the cylinder of the engine is maintained at an approximately constant ratio. Furthermore, since the suction piston 8 is supported by the bearing 17, the engine temperature has no influence on the movement of the suction piston 8. Therefore, the suction piston 8 can move in response to a change in the amount of air fed into the cylinder of the engine independently of the engine temperature. Consequently, by using the variable venturi-type carburetor 2 illustrated in FIG. 2, the air-fuel ratio of the fuel mixture fed into the cylinder of the engine can be maintained at an approximately constant ratio, for example, at an approximately stoichiometric air-fuel ratio, independently of the engine temperature and the engine operating conditions.

Referring to FIG. 2, an annular air chamber 33 is formed around the metering jet 26, and a plurality of air-bleed bores 34, connected to the annular air chamber 33, is formed on the inner wall of the metering jet 26. The annular air chamber 33 is connected, on the one hand, to the intake passage 7 located upstream of the raised wall 29 via a first air-bleed passage 35 and, on the other hand, to an electromagnetic valve 50 via a second air-bleed passage 36. A first air-bleed jet 37 is inserted into the first air-bleed passage 35, and a second air-bleed jet 38 is inserted into the second air-bleed passage 36. In addition, an auxiliary air-bleed passage 39 is branched off from the air-bleed passage portion which is common to the first air-bleed passage 35 and the second air-bleed passage 36. The auxiliary air-bleed passage 39 is open to the fuel passage 25 located downstream of the metering jet 26.

Figure 1A:
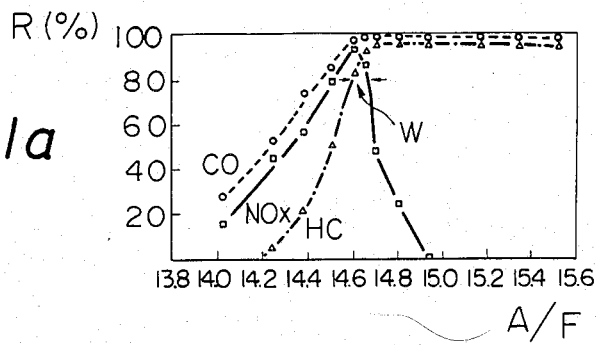
FIGS. 1a–1c are diagrams illustrating exhaust gas conversion efficiency.
Figure 1B:
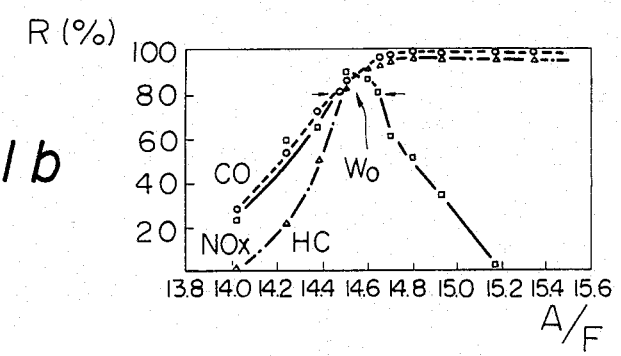
Figure 1C:
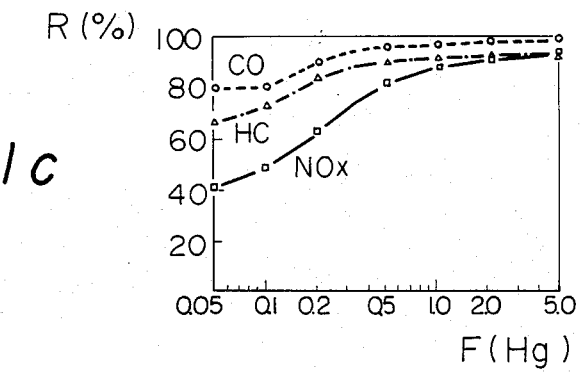
Figure 5A:
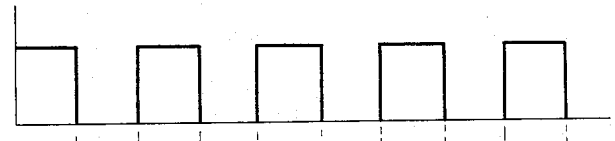
FIGS. 5a and 5b are diagrams illustrating fluctuations of the air-fuel ratio.
Figure 5B:
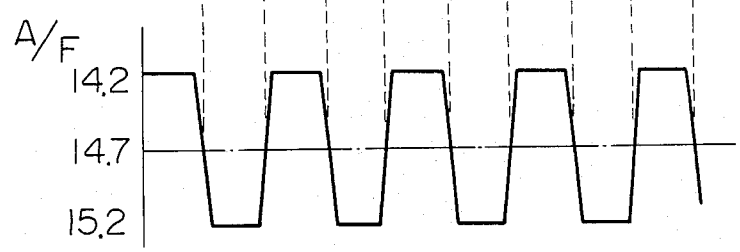

The electromagnetic valve 50 comprises a valve chamber 52 which is open to the atmosphere via an air filter 51, a valve port 53 connected to the second air-bleed passage 36 and open to the valve chamber 52, a valve body 54 which controls the opening operation of the valve port 53, a movable plunger 55 connected to the valve body 54, and a solenoid 56 for attracting the movable plunger 55. The solenoid 56 is connected to a solenoid drive circuit 60. The solenoid drive circuit 60 comprises a pulse generator 61 which produces rectangular pulses having a frequency of 1 through 2 Hz, as illustrated in FIG. 5(a), and a power amplifier 62 connected to the output terminal of the pulse generator 61. The output terminal of the power amplifier 62 is connected to the solenoid 56. The valve body 54 normally closes the valve port 53, and when the pulse generator 61 produces a pulse, since the solenoid 56 is energized, the valve body 54 opens the valve port 53. Consequently, the valve body 54 periodically opens the valve port 53 at a frequency of 1 through 2 Hz. When the valve body 54 opens the valve port 53, since air is fed into the second air-bleed passage 36 via the air filter 51, the valve chamber 52, and the valve port 53, the amount of air fed into the fuel passage 25 from the air-bleed bores 34 and the auxiliary air-bleed passage 39 is increased. As a result, since the amount of fuel fed from the nozzle 28 is reduced, the fuel mixture fed into the cylinder of the engine becomes lean. The sizes of the first air-bleed jet 37 and the second air-bleed jet 38 are determined so that when the valve body 54 of the electromagnetic valve 50 repeatedly opens the valve port 53, the mean value of the air-fuel ratio A/F of the fuel mixture fed into the cylinder of the engine becomes equal to an approximately stoichiometric air-fuel ratio and so that the air-fuel ratio A/F fluctuates within the range of a ±0.2 A/F unit through a ±1.0 A/F unit relative to the stoichiometric air-fuel ratio, as illustrated in FIG. 5(b). Consequently, since the air-fuel ratio of the fuel mixture fed into the cylinder of the engine fluctuates at a frequency of 1 through 2 Hz within a ±0.2 A/F unit through a ±1.0 A/F unit relative to an approximately stoichiometric air-fuel ratio independently of the engine temperature and the engine operating conditions and since the mean valve of the fluctuating air-fuel ratio is maintained within the window $W_0$ illustrated in FIG. 1(b), it is possible to obtain a high conversion efficiency by using the oxygen storage function of the three-way monolith catalyzer 5.

According to the present invention, since a good exhaust gas-purifying operation can be achieved by using an inexpensive carburetor and an inexpensive electronic control unit for controlling the air-fuel ratio, it is possible to considerably reduce the manufacturing cost of the exhaust gas-purifying device. In addition, since it is possible to construct an exhaust gas-purifying device by merely arranging the electromagnetic valve 50 in the air-bleed passage 36, construction of the exhaust gas-purifying device is simple, and, thus, it is possible to improve the reliability of the exhaust gas-purifying device.

While the invention has been described with reference to a specific embodiment chosen for purposes of illustration, it should be apparent that numerous modifications could be made thereto by those skilled in the art without departing from the basic concept and scope of the invention.

We claim:

1. An exhaust gas-purifying device of an internal combustion engine having an exhaust passage, a three-way catalytic converter arranged in the exhaust passage, and a carburetor having therein an intake passage and a fuel passage for feeding fuel into the intake passage, said device comprising:

a suction piston transversely movable in the intake passage of said carburetor, said suction piston having a tip face defining a venturi portion and a raised wall formed on the inner wall of the intake passage at a position opposite said suction piston, the tip face of said suction piston having an upstream end portion which has a V-shaped cross-section expanding toward said venturi portion and which cooperates with the raised wall for defining an approximately isosceles triangle-shaped air flow restricting opening therebetween when the amount of air flowing within the intake passage is small:

an air-bleed passage connected to the fuel passage for feeding air into the fuel passage;

valve means arranged in said air-bleed passage for controlling the flow area of said air-bleed passage; and control means for controlling the opening operation of said valve means to periodically open said valve means at a fixed frequency of one through two Hz, said air-bleed passage having a flow area which causes the air-fuel ratio of the fuel mixture formed in the intake passage to fluctuate within the range of a ±0.2 A/F unit through a ±1.0 A/F unit relative to an approximately stoichiometric air-fuel ratio when said valve means is periodically opened.

2. An exhaust gas-purifying device according to claim 1, wherein said valve means comprises an electromagnetic valve and said control means comprises a pulse generator for producing pulses actuating said electrocmagnetic valve.

3. An exhaust gas-purifying device according to claim 1, wherein the carburetor is a variable venturi-type carburetor which comprises a metering jet arranged in the fuel passage and having a plurality of air-bleed bores formed on an inner wall of said metering jet, said air-bleed passage being connected to said air-bleed bores.

4. An exhaust gas-purifying device according to claim 1, wherein said air-bleed passage comprises a first air-bleed passage and a second air-bleed passage which are open to the atmosphere via corresponding air-bleed jets having a fixed flow area, said valve means being arranged in said second air-bleed passage.

5. An exhaust gas-purifying device according to claim 1, wherein the tip face of said suction piston has a groove formed thereon and extending along an axis of said intake passage, the top face of said suction piston having a V-shaped cross section which expands from said groove towards said venturi portion.

* * * * *